United States Patent Office 3,404,589
Patented Oct. 8, 1968

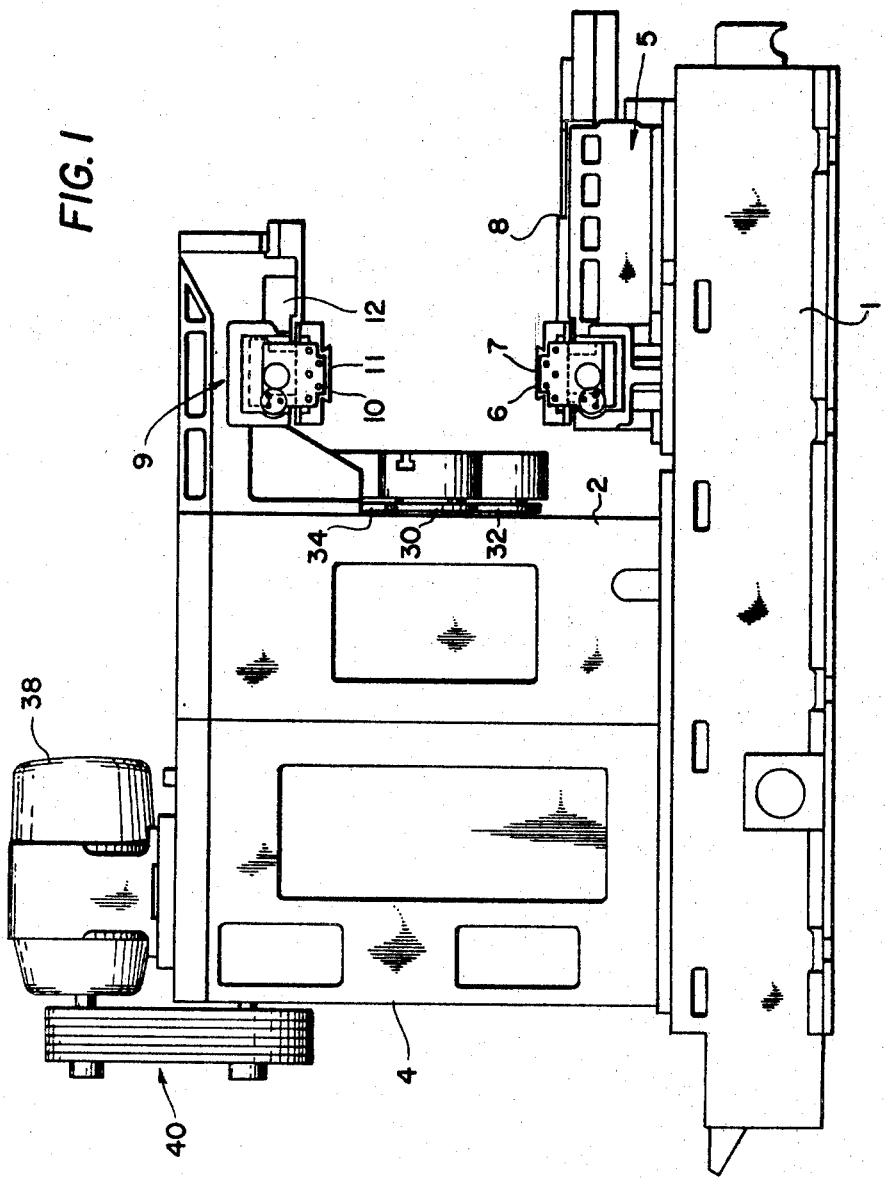

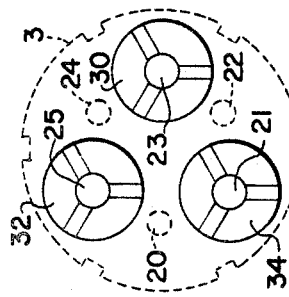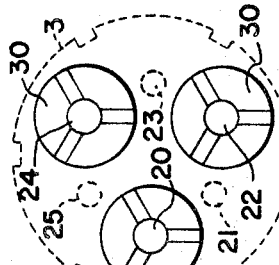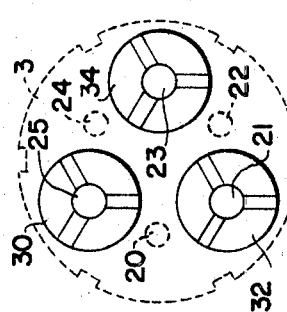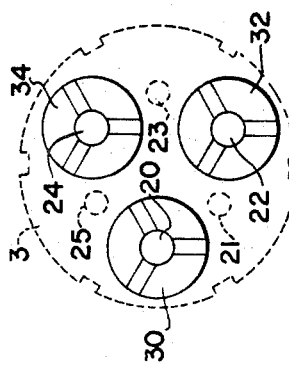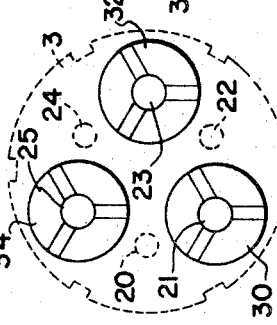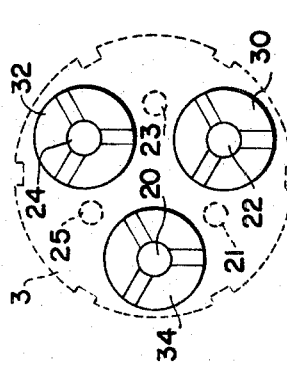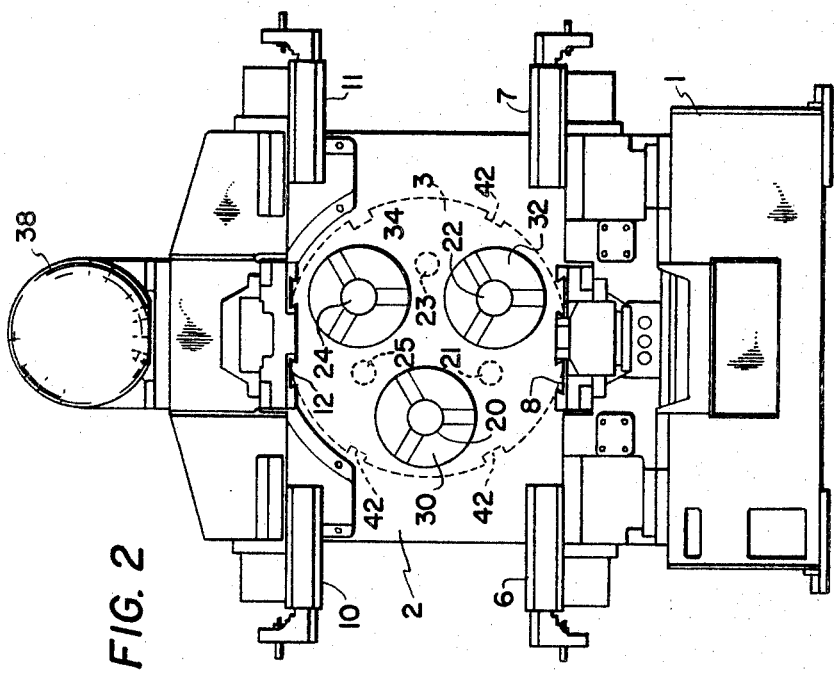

3,404,589
INDEXIBLE MULTIPLE SPINDLE LATHE
Roger W. Brown and Robert R. Rhodehamel, Windsor Vt., assignors to Pneumo Dynamics Corporation, Cleveland, Ohio, a corporation of Delaware
Filed Oct. 31, 1966, Ser. No. 590,831
6 Claims. (Cl. 82—3)

ABSTRACT OF THE DISCLOSURE

Providing for increased spindle capacity in indexible multiple spindle lathes to combine the advantages of single and multiple spindle lathes.

---

This invention relates to machine tools and more particularly to a new class of machine tools of the automatic type which combines many of the advantages inherent in both of the machines known as the single spindle and multiple spindle automatics.

As is well known in the art, the multiple spindle type machine is designed primarily for high productivity where relatively complex machining must be performed. This type of machine has a multiplicity of workpiece carrying spindles which are indexed from one machining station to the next thereby producing a finished piece for each individual index of the spindles, once the machine has been loaded. Cross and end moving slides are commonly employed for the machining function and act upon each workpiece at the various stations after each index of the spindles. One station usually performs no machining operation and this station is conveniently utilized as a workpiece loading and unloading station.

The other most commonly utilized machine in this type of machining is the single spindle automatic which commonly employs a five or six sided turret, each face of which must be indexed into operative relationship with the workpiece to perform a particular function. Thus in this machine a single piece is produced after the machine has completed a number of indexing cycles corresponding to the utilized faces of the turret. The size of pieces produced by this type of machine is not limited as the basic machine may be scaled either up or down to provide for various capacities.

Basically, the single spindle machine provides for quick set up of production cycles and utilizes relatively simple tooling but is limited in the time that it takes to complete a finished part in addition to the fact that it loses cutting time during loading and unloading. The basic design of the multiple spindle machine provides adequate room for various tools and attachments and the machine is noted especially for its high productivity in producing a finished part for every indexing cycle of the machine. The multiple spindle machine is limited in its chucking capacity, however, and the machine itself must be inordinately large in order to handle workpieces of a size comparable to those which can be accommodated in the single spindle machine.

Thus it is an object of this invention to provide a new type of machine tool which combines the advantages of the single spindle and multiple spindle machines.

It is a further object of this invention to provide a machine tool which produces a finished piece in only a few indexing cycles and has adequate capacity for accommodating larger type workpieces than the typical multiple type spindle machine without substantially increasing the overall size of the machine.

It is a still further object of this invention to provide a machine tool which has a plurality of machining stations and a plurality of workpiece-carrying spindles equal in number to one-half or one-third the number of machining stations.

It is still another object of this invention to provide a machine tool which has three simultaneously indexable spindles and six distinct operating stations such that a finished piece is produced for every two indexes of the spindles.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail illustrative embodiments of the invention, these being indicative, however, of but several of the various ways in which the principles of the invention may be employed.

In said annexed drawings:
FIG. 1 is a side elevational view of the machine tool showing the relationship of the cross and end working slides to the spindles of the machine tool.
FIG. 2 is a right hand end elevational view of the machine looking into the machining area and showing the disposition of the spindles in relation to the tool slides.
FIGS. 3–8 are schematic diagrams of the various index positions of the spindles of the machine tool of this invention.

Referring now to FIG. 1, the machine tool comprises a base 1, a housing 2 for the spindle carrier 3 supported on the base, and a housing 4 that contains the indexing and drive mechanisms also supported on the base. On the front end of the base 1 is another housing indicated generally at 5 for the lower cross 6, 7 and end working slides 8 while at the top of the housing 2 is a support indicated generally at 9 for the upper cross 10, 11 and end 12 working slides. As best seen in FIG. 2 this particular configuration of the machine comprises a total of four cross slides and an upper and lower end working slide. A spindle carrier 3 is rotatably mounted in the housing 2 and is rotated to various positions by an indexing mechanism (not shown) which determines unique machining stations 20–25 for the machine tool.

Three spindles 30, 32, 34 bearing, for example, chucks for clamping and imparting rotation to the workpieces are rotatably mounted in the spindle carrier 3 and are indexed with the spindle carrier. The spindles are equaly spaced and thus occupy positions 120° apart, being coincident with the machining stations. A motor 38 and drive pulley system 40 are shown mounted on the top of the housing 4 to impart rotation to the spindles 30, 32, 34 through a drive train mechanism (not shown) which may be any one of many possible configurations well known in this art. Although three spindles are shown in this embodiment of the machine, it will be understood as brought out in more detail hereinafter, that two or any greater number of spindles may be employed in machines of similar design and still utilize the principles of this invention.

The indexing mechanism for the spindle carrier 3 similarly may be of many different forms and it is sufficient to state that the mechanism indexes the spindle carrier 3 for a specified part of a single rotation. Further in this regard, a plurality of lock pin slots 42 are located in the periphery of the spindle carrier 3 equally spaced about the spindle carrier, which slots 42 in cooperation with a shot bolt (not shown) provide an accurate end position for each index. In this embodiment of the invention there are six lock pin slots 42, each located 60° apart on the spindle carrier 3.

Referring now to FIGS. 3–8 there is shown in schematic form the different positions taken by the spindles 30, 32, 34 throughout the complete machining cycle of a particular workpiece. The various machining stations are indicated by the reference numerals 20–25 and it may be seen by reference to FIG. 2 that the following relationships take place between the spindle 30 originally in position 20 and the various tool slides. It will be understood that the other spindles 32, 34 attain the same relationships when they are in the following specified machining stations. Position 20 is the loading and unloading station for the machine and in a chuck type machine such operation may be performed manually by an operator stationed in front of the machine. In a bar-type automatic machine (not shown) this operation would be completely automatic wherein a cut-off slide might be actuated to sever the finished workpiece and the bar feed mechanism operated to present new material for the next machining cycle. When the spindle carrier 3 is indexed to move the spindle 30 to station 21 as seen in FIG. 4, the workpiece is most conveniently acted upon by tooling carrier by the lower left cross slide 6 and the left hand side of the lower end working slide 8. After the next index the spindle 30 will be in station 22 as seen in FIG. 5 and will be conveniently acted upon by the lower right cross slide 7 and the right hand portion of the lower end working slide 8. A further index will bring spindle 30 to station 23 where tooling carried by the upper 11 and lower 7 right hand cross slides may be effective upon the workpiece. It will also be noted that at station 23 there is a maximum amount of space for tooling attachments which may be mounted on housing 2 or the cross slides 7, 11 although such special tooling is not restricted to this location and may be utilized at any working station of the machine. It will be seen that upon further indexes the spindle 30 will be carried to stations 24, 25, and back to 20 and be acted upon in turn by the upper cross slides 10, 11 and the upper end working slide 12 in a manner similar to that described at stations 20–23.

It will be understood by those skilled in the art that each of the spindles 30–34 will be continuously rotating even through the indexing movement of the spindle carrier 3 except when a brake is applied to the spindle when it is in location 20 for loading and unloading purposes. The sequence of events of operation of the machine tool is also well understood in the art and it is known that the lock pin must be removed prior to index by suitable mechanism, the spindle carrier indexed to the next position, the lock pin reinserted to provide an accurate orientation, and the appropriate tool slides actuated to perform the machining. Suitable programming means (not shown) are provided to control the sequence of events by actuating the individual mechanisms at the appropriate times. Tool slide actuation is accomplished by a hydraulic ram connected between the base 1 or housing 2 and the movable portion of the tool slide although any other mechanism may be used whether it be mechanical, electrical or hydraulic. A conventional dovetail type interengagement between the relatively moving portions of the tool slides may retain and restrict the movement of the slides in a desired manner or retain various tools on the tool slides.

As best seen in FIG. 2, it will be appreciated that relatively large chucks may be accommodated in this type of machine and the chucks are limited in size only by the overall size of the machine tool itself and the amount of clearance desired between the workpiece retained in the chuck and the tooling provided at each of the working stations. Thus it is seen that although relatively large chucks are employed, most of the advantages of the multiple spindle type machine are still retained. There is a continuity of production in that even though one spindle must be braked in order to load or unload a workpiece, the other spindles are still rotating and machining operations are being performed.

In setting up a machine of the multiple spindle type, the amount of time required for loading and unloading a workpiece may in some instances determine the amount of time allotted for the machining operation on the other spindles. A cycling advantage is gained in the instant invention in this situation if the operations requiring the longest machining time are set up to occur at the stations occupied by the spindles when one spindle is in the loading position. When the three spindles are in the locations 21, 23, and 25, the amount of time required to remain in this orientation is determined by the longest machining operation which must be performed. Thus if the shortest operations are set up in these positions, the cycle time for this operation may be kept very short. It is obvious, even in the usual situation, when loading and unloading times are not determinative of the maximum cycle time, that an advantage is still gained in separately planning the tooling cycles of alternate positions of the spindles so that a maximum of cutting time is utilized in a minimum of cycle time. Such an advantage is not attainable in the conventional multiple spindle automatic.

As pointed out previously, although three spindles 30–34 and six indexing stations 20–25 are shown in this embodiment of the machine, it is possible that other combinations of spindles and index stations may be utilized. Thus a different design of this machine using the principles of this invention might include four spindles disposed 90° apart on a spindle carrier which may be indexed to eight discrete locations and have suitable tool slides operated in conjunction herewith. It has been determined, however, that the embodiment shown and described in this specification is the preferred embodiment of this machine and provides the most gain in chucking capacity while retaining the variability provided by a multiplicity of index stations.

Other modes of applying the principle of the invention may be employed, change being made as regards the details described, provided the features stated in any of the following claims or the equivalent of such be employed.

We, therefore, particularly point out and distinctly claim as our invention:

1. A machine tool comprising a base, means rotatably mounted on said base for indexing movement to a plurality of stations, work holding means rotatably mounted on said means in angularly spaced relation for supporting workpieces in relation to said base, drive means for imparting rotation to said work holding means and for intermittently indexing said means through an angle smaller than the angle of spacing of said work holding means, and tool means reciprocably mounted on said base at the stations in operative relationship to the work supported by said work holding means and operable by said drive means to engage the workpieces to perform a machining operation upon each index of said means.

2. A machine tool comprising a base, a spindle carrier rotatably mounted on said base for intermittent movement to a plurality of index stations, a plurality of spindles, equal in number to one half the number of index stations, rotatably mounted in said spindle carrier for supporting parts to be machined at the index stations, means for indexing said spindle carrier to each of the index stations, said spindles being presented to alternate index stations at each index of said spindle carrier, and means mounted on said base near the index stations to perform machining operations upon the workpieces held by said spindles.

3. A machine tool for high production machining of work comprising a base comprising a lower horizontal portion, an upper horizontal portion, and a vertical housing interconnecting the portions, an indexing assembly mounted in the vertical housing between the upper and lower horizontal portions of the base to be indexed to discrete positions in a plane perpendicular to the horizontal portions, a plurality of spindles lesser in number than the discrete positions of index rotatably mounted in said indexing assembly to be indexed with said indexing assembly, said spindles rotatable about horizontal parallel axis and adapted to releasably secure workpieces therein, a plurality of tooling means operatively mounted on said base adjacent the discrete positions of said indexing assembly to cooperate with the workpieces secured in said spindles to perform a machining operation, and control means mounted on the base to continuously rotate said spindles, to index said indexing assembly and to operate said tooling means in a predetermined manner.

4. A machine tool as set forth in claim 3 wherein said indexing assembly is a spindle carrier indexable to six equally spaced positions and three spindles are symmetrically mounted therein so that alternate sets of equally spaced positions are occupied by said three spindles at every index of said spindle carrier.

5. A machine tool as set forth in claim 3 wherein the discrete positions are twice the number of said plurality of spindles.

6. A machine tool as set forth in claim 3 wherein said indexing assembly completes two indexes to bring any one spindle to the position previously occupied by the next advanced spindle in the machining cycle.

References Cited
UNITED STATES PATENTS

| | | | |
|---|---|---|---|
| 3,011,245 | 12/1961 | Mueller | 29—38 |
| 3,283,625 | 11/1966 | Smith | 82—3 |

LEONIDAS VLACHOS, *Primary Examiner.*